United States Patent
Gao

(10) Patent No.: US 8,351,117 B2
(45) Date of Patent: Jan. 8, 2013

(54) OPTICAL ISOLATOR, SHUTTER, VARIABLE OPTICAL ATTENUATOR AND MODULATOR DEVICE

(76) Inventor: Peiliang Gao, Santa Clara, CA (US)

(*) Notice: Subject to any disclaimer, the term of this patent is extended or adjusted under 35 U.S.C. 154(b) by 327 days.

(21) Appl. No.: 12/329,928

(22) Filed: Dec. 8, 2008

(65) Prior Publication Data

US 2010/0142046 A1    Jun. 10, 2010

(51) Int. Cl.
G02B 27/28    (2006.01)

(52) U.S. Cl. .................................. 359/484.03

(58) Field of Classification Search .......... None
See application file for complete search history.

(56) References Cited

U.S. PATENT DOCUMENTS

| | | | |
|---|---|---|---|
| 3,527,521 A * | 9/1970 | Osterink et al. ............. | 359/484 |
| 3,656,068 A | 4/1972 | Runge | |
| 3,970,967 A | 7/1976 | Iliff | |
| 4,250,466 A | 2/1981 | Jernigan | |
| 4,439,014 A | 3/1984 | Stacy et al. | |
| 4,841,528 A | 6/1989 | Sipes | |
| 5,161,049 A * | 11/1992 | Tanno et al. ................. | 359/281 |
| 5,446,813 A | 8/1995 | Lee et al. | |
| 6,560,382 B1 | 5/2003 | Lasher et al. | |
| 6,563,845 B2 | 5/2003 | Kumkar | |
| 6,757,097 B1 | 6/2004 | Frisken | |
| 6,839,170 B2 | 1/2005 | Li | |
| 6,927,909 B2 * | 8/2005 | Minemoto .................... | 359/484 |
| 6,944,363 B2 | 9/2005 | Li et al. | |
| 6,950,235 B2 | 9/2005 | Sabia et al. | |
| 6,977,763 B1 | 12/2005 | Wang et al. | |
| 7,050,694 B2 | 5/2006 | Gustavson et al. | |
| 7,110,179 B2 | 9/2006 | Naylor et al. | |
| 7,130,319 B1 | 10/2006 | Kaneda | |
| 7,154,668 B2 | 12/2006 | Patel et al. | |
| 7,173,762 B2 | 2/2007 | Haung et al. | |
| 7,230,760 B2 | 6/2007 | Naylor et al. | |
| 7,253,956 B2 | 8/2007 | Shoda et al. | |
| 7,336,418 B1 | 2/2008 | Kawai et al. | |
| 7,379,226 B2 | 5/2008 | Nakamura et al. | |
| 7,412,132 B1 | 8/2008 | Liu et al. | |
| 2006/0203340 A1 | 9/2006 | Hesline | |
| 2009/0180776 A1 | 7/2009 | Brodsky | |

FOREIGN PATENT DOCUMENTS

| | | |
|---|---|---|
| CN | 2505867 Y | 8/2002 |
| CN | 1996073 | 7/2007 |
| CN | 101141221 | 3/2008 |
| CN | 101246239 | 8/2008 |
| CN | 101630814 | 1/2010 |
| CN | 10162988 | 3/2010 |
| CN | 101672954 | 3/2010 |
| CN | 101672986 | 3/2010 |

(Continued)

OTHER PUBLICATIONS

English translation of JP 61-172069 A.*

(Continued)

*Primary Examiner* — Derek S Chapel
(74) *Attorney, Agent, or Firm* — IPxLaw Group LLP

(57) ABSTRACT

An integrated optical device functioning as optical isolator, shutter, variable optical attenuator, and modulator is disclosed. The device employs a Pockels cell for dynamically rotating with nanosecond speed the polarization state of incident light for attenuation and modulation. The invention provides a compact, high performance and reliable device without moving parts for use in laser systems and particularly in fiber optic telecommunication system.

12 Claims, 3 Drawing Sheets

FOREIGN PATENT DOCUMENTS

| | | |
|---|---|---|
| CN | 101673921 | 3/2010 |
| JP | 61172069 A * | 8/1986 |
| WO | WO2007064238 A1 | 6/2007 |
| WO | PCT/CN2010/072617 | 3/2011 |
| WO | PCT/CN2010/072608 | 10/2011 |
| WO | PCT/CN2010/072624 | 10/2011 |

OTHER PUBLICATIONS

ISR for PCT/CN2010/072617.
ISR for PCT/CN2010/072624.
ISR for PCT/CN2010/072608.

* cited by examiner

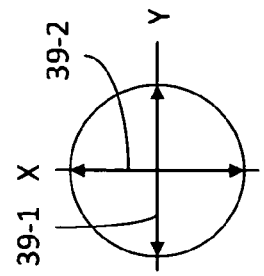
Fig. 3C
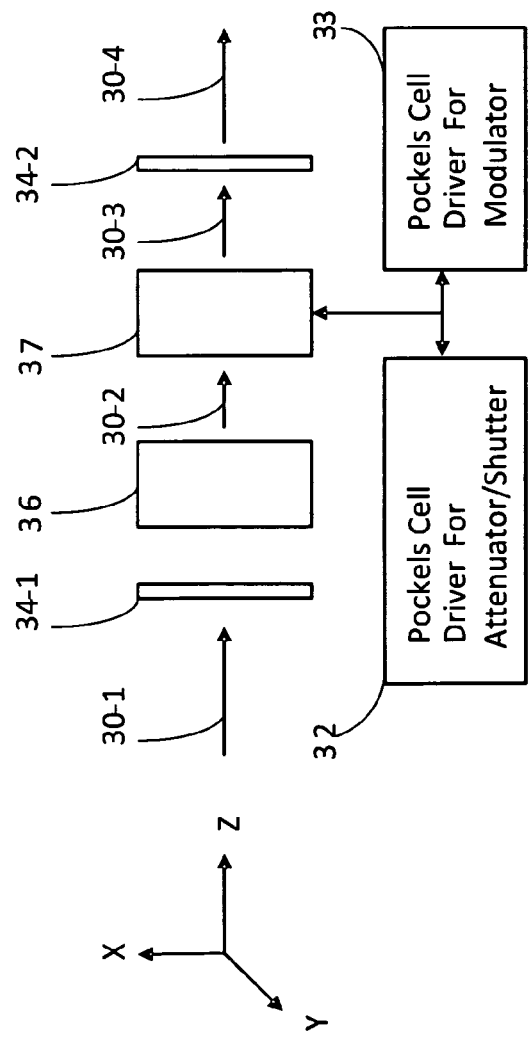
Fig. 3A
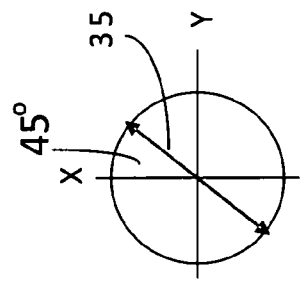
Fig. 3B
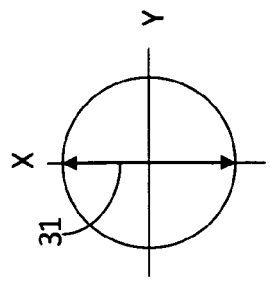

OPTICAL ISOLATOR, SHUTTER, VARIABLE OPTICAL ATTENUATOR AND MODULATOR DEVICE

CROSS-REFERENCE TO RELATED APPLICATIONS

1. Field of the Invention

This invention relates to a free-space, polarization-dependent optical isolator, shutter, variable optical attenuator, and modulator device, and more particularly to a device which uses an optical Pockels cell, and Faraday rotator to control the optical polarization state.

2. Description of the Related Art

An optical isolator, shutter, variable attenuator, and modulator are all widely used in laser systems and particularly in modern fiber optical telecommunication networks.

An optical isolator eliminates unwanted or reflected optical signals from interfering with a desired optical function. In fiber optic communications systems, some light may be reflected back from the fiber network. This reflected light affects the operation of the laser diode by interfering with and altering the frequency of the laser output oscillations. For this reason, an optical isolator is typically provided between the laser diode and the optical fiber to minimize the reflection from the fiber network.

FIG. 1A shows a conventional optical isolator configuration as disclosed in the prior art. The isolator includes two polarizers (14-1 and 14-2) and a Faraday rotator 16 disposed between the polarizers 14-1 and 14-2. FIG. 1B shows the polarization plane orientation of two polarizers with polarization plane 11 of first polarizer 14-1 aligned with the x-axis and polarization plane 15 of second polarizer 14-2 aligned at 45 degree angle from x-axis. After passing through the first polarizer 14-1, the Faraday rotator 16 rotates the polarization of the input beam of light 10-1 by 45 degrees, so that the beam of light 10-2 can then pass without change through the second polarizer 14-2.

The rotation of the polarization plane provided by the Faraday rotator 16 for a light ray traveling in one direction allows light to pass through both polarizers 14-1 and 14-2, whereas for a light ray traveling in the direction opposite to beam 10-1, the plane of polarization is rotated so that the passage of the back reflected light of light 10-3 through the Faraday rotator 16 is blocked by the first polarizer 14-1.

An optical attenuator is a very important element of an optical circuit for controlling an optical signal transmission. In fiber optic communication systems, variable optical attenuators are broadly employed to regulate the optical power levels to prevent damage to the optical receivers caused by irregular optical power variations. As the optical power fluctuates, a variable optical attenuator is employed, in combination with an output power detector and a feedback control loop, to adjust the attenuation and to maintain at a relatively constant level the optical power transmitted to a photo-receiver. Optical signal attenuation can be accomplished in a variety of ways by diverting all or a portion of an optical signal from an original pathway.

Variable optical attenuators (VOA) have been developed with a variety of technologies. Currently, there are several types of commercially available variable optical attenuators in the market, such as opto-mechanical VOA devices using stepping motor or magneto-optical crystal, devices using liquid crystal (LC) technology, and devices using micro-electromechanical systems (MEMS) technology.

Optical shutters or switches implemented with Pockels cells, which are based on an electro-optical crystal's birefringence, are usually found in non-telecommunications applications, mainly because of the cell's very high voltage requirement. The Pockels electro-optic effect produces birefringence in an optical medium by a constant or varying electric field. The electric field can be applied to the crystal medium either longitudinally or transversely to the light beam. Longitudinal Pockels cells need transparent or ring electrodes. Transverse voltage requirements can be reduced by lengthening the crystal. A Pockels cell 26 combined with two polarizers 24-1, 24-2 can be used for a variety of applications. FIG. 2A shows a simple configuration of a Pockels cell-based device having multiple functions such as an optical variable attenuator and modulator as disclosed in the prior art.

FIG. 2B shows the polarization plane orientation for a normally closed shutter (the shutter is closed without applied voltage) of two polarizers with the polarization plane 21 of the first polarizer 24-1, in FIG. 2A, aligned with x-axis, and the polarization plane 25 of second polarizer 24-2 aligned with y-axis. When a variable electric field generated by Pockels cell driver 29 has a value between zero and the half-wave voltage, i.e., the voltage under which the plane of polarization of incident light is rotated 90 degrees by Pockels cell 26, the input light beam 20-1 can be attenuated from completely off to completely transparent when light beam 20-2 exits polarizer 24-2 as light beam 20-3.

Such a configuration is not often used in fiber optical telecommunication system mainly because of the extremely high voltage (half wave voltage is about a few thousand volts or even higher) requirements, even though the response time is ultrafast, on the order nanoseconds. However, with the development of the new materials, the voltage required to create birefringence has been substantially reduced, and therefore the present invention is a viable approach for fiber optical telecom networks, especially in transmitters with capability of directly modulating the signal emitted from at laser at very high frequencies and low voltage.

BRIEF SUMMARY OF THE INVENTION

One embodiment of the present invention is an integrated, multifunctional optical device. The device includes a first and second polarizer, a Pockels cell, a Faraday rotator, at least one electric driver for the attenuator and shutter and an electric driver for the modulator. Each of the polarizers has a particular polarization plane. The polarization plane of said second polarizer is oriented at a 45 degree angle to the plane of said first polarizer. The first polarizer receives the input light beam and the second polarizer provides output light beam. The Pockels cell is configured to rotate an input beam based on an external voltage. The Faraday rotator disposed between the first polarizer and the Pockels cell. The Pockels cell is disposed between said Faraday rotator and said second polarizer to receive the input beam from the Faraday rotator. The Pockels cell has two birefringent axes aligned at 45 degrees symmetrically to the polarization plane of the said second polarizer. One electric driver is configured to drive the attenuator and the shutter. Another electric driver is configured to drive the modulator.

It is an object of the present invention to provide an integrated, compact and multi-functional optical device operating as optical isolator, shutter, variable attenuator, and optical modulator without moving parts for applications in variety of laser systems and, in particular, in fiber optic telecommunication networks.

It is also an object of the present invention to provide ultrafast (nanosecond level) variable attenuation and shuttering of optical signals.

With such a simple and integrated design leading to better manufacturability, it is further an object to make such a device mass producible at low cost.

BRIEF DESCRIPTION OF THE DRAWINGS

These and other features, aspects and advantages of the present invention will become better understood with regard to the following description, appended claims, and accompanying drawings where:

FIG. 3A shows an embodiment of present invention for an integrated device with multiple functions;

FIG. 3B illustrates the polarization plane orientation of two polarizers in an embodiment of the present invention; and FIG. 3C illustrates the orientation of two axes of the birefringent Pockels cell with respect to the polarization plane orientation of two polarizers.

DETAILED DESCRIPTION OF THE INVENTION

Figure 1A:
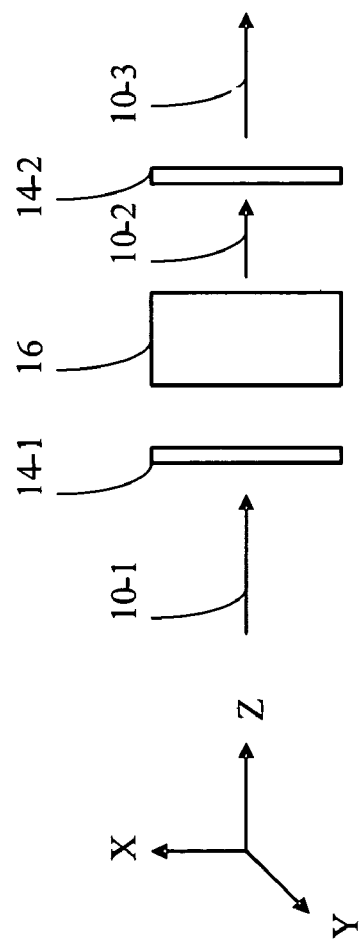
FIG. 1A shows an optical isolator design utilized in the prior art.
Figure 1B:
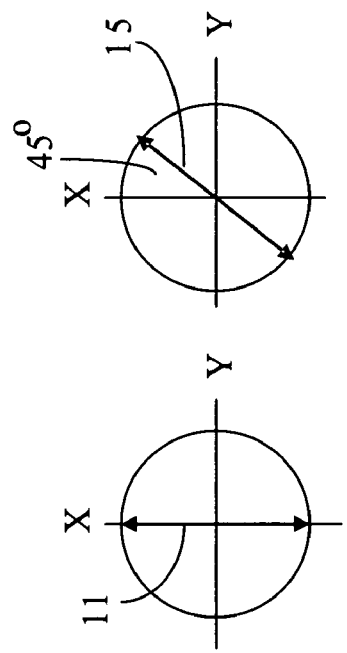
FIG. 1B illustrates the polarization plane orientation of two polarizers in an isolator design.
Figure 2A:
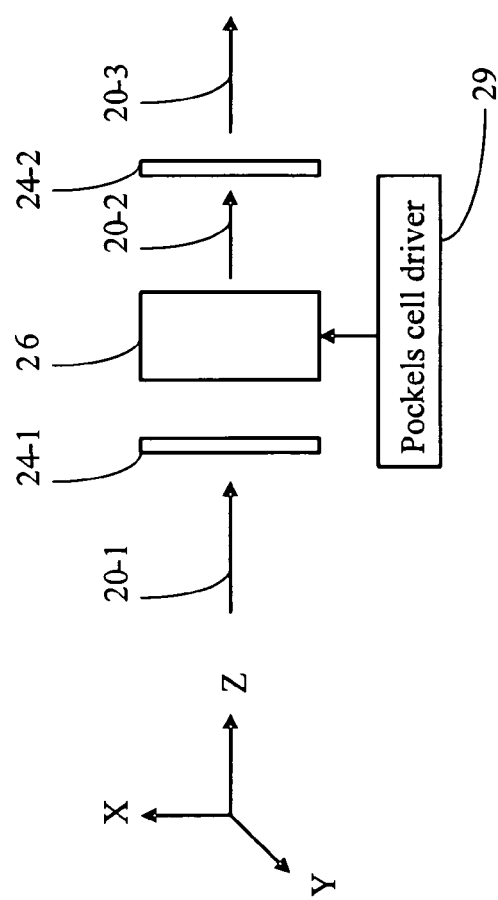
FIG. 2A shows an attenuator design utilized in the prior art.
Figure 2B:
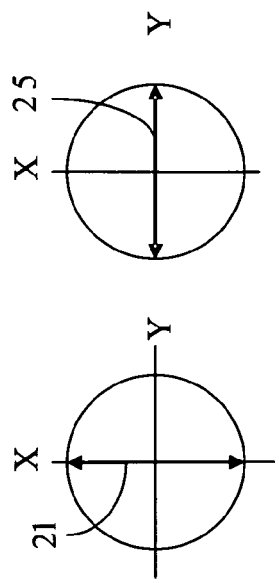
FIG. 2B illustrates the polarization plane orientation of two polarizers in the attenuator design.

In a preferred embodiment, the configuration of an integrated device performing the functions of isolator, attenuator, shutter, and modulator is schematically shown in FIG. 3A. For easy understanding of the description, the axes of coordinates are set as follows. Let a z-direction (toward the right in the drawing) indicate the direction in which the optical components are aligned and let the x-direction (vertical direction) and y-direction (horizontal direction) indicate the two directions orthogonal to the z-direction. The polarization plane 31 of the first polarizer 34-1 is aligned with the x-axis, and the polarization plane 35 of second polarizer 34-2 is aligned at 45 degrees to the x-axis as shown in FIG. 3B. In this system, the collimated input light beam 30-1 is substantially linearly polarized, substantially coherent, monochromatic and collimated. The input light beam 30-1 is also oriented with the polarization axis of the first polarizer 34-1 to pass through the first polarizer 34-1, which performs the Jones matrix operation $$\begin{bmatrix} 0 & 0 \\ 0 & 1 \end{bmatrix}.$$

The polarization orientation of light beam 30-2 is rotated 45 degrees (in x and y plane) after passing through the Faraday rotator 36, i.e., $$\frac{1}{2}\begin{bmatrix} 1 & 1 \\ 1 & 1 \end{bmatrix},$$

which is designed to work for the prescribed wavelength of the input light since the rotation angle by Faraday rotator is wavelength dependent. Typically, the Faraday rotator is configured for a single wavelength or within a certain wavelength range to meet the wavelength requirement for the application.

The Pockels cell 37 includes a transparent isotropic or non-birefringent medium. The Pockels cell medium is selected to meet specific wavelength requirement according to the application. Without an applied electric field, the cell 37 allows the light 30-3 to pass through the second polarizer 34-2, which is oriented at 45 degrees from the polarization plane 31 of first polarizer 34-1. Under these conditions, for the input light propagating in the z-direction, the system is transparent to the input light beam 30-1 but blocking to the reflected light of light beam 30-4. The configuration depicted in FIG. 3A operates in a fashion similar to the isolator depicted in FIG. 1A which provides substantial attenuation in a backward direction.

When the electric field generated by driver 32 and/or 33 is applied, the Pockels cell 37 becomes a voltage-controlled wave plate, i.e., $$e^{i\theta(V)}\begin{bmatrix} 1 & 0 \\ 0 & \pm i \end{bmatrix},$$

with birefringent axes 39-1 and 39-2 aligned with x-axis and y-axis as shown in FIG. 3C. In order for the system to work as a shutter, drive 32 applies a voltage V sufficient to make Pockels cell 37 become a half wave plate, i.e., $$e^{i\theta(V)}\begin{bmatrix} 1 & 0 \\ 0 & \pm i \end{bmatrix}, \text{ with } \theta(V) = \frac{\pi}{2},$$

which rotates the polarization direction of the input light 30-2 exiting from the Faraday rotator 36 by 90 degrees in x-y plane. Such a voltage is usually called half-wave voltage. The light beam 30-3, with its polarization plane 90 degrees to that of the polarizer 34-2, is then completely blocked by the polarizer 34-2. Due to the ultrafast response time of a typical Pockels cell, such a shutter can be made with nanosecond switching time as disclosed in the art.

With the applied voltage less than the half-wave voltage, the system acts as an attenuator. By varying the applied voltage, the intensity of the incident light beam 30-1 reaching the output 30-4 via the second polarizer 34-2 varies from being fully transmitted to being completely blocked. In practice, some insertion losses are incurred even without the applied electric field due to the material absorption, scattering, reflection, and misalignment of the polarization axes, etc. It should be noted that even though the back reflection isolation of light beam 30-4 of the preferred system configuration is degraded when the system is used as an attenuator, the back reflection is also substantially reduced for the attenuated input light beam 30-1. Therefore, the total back reflection isolation for the system is not significantly sacrificed. It is clear that the system can modulate the input light 30-1 when Pockels cell 37 is driven by modulator driver 33. Due to the high half wave voltage needed, a high modulation frequency is difficult to achieve for on-off states, but small amplitude modulation of light 30-1 is practical.

Although the present invention has been described in considerable detail with reference to certain preferred versions thereof, other versions are possible. For example, the device can be configured as a normally-closed shutter (i.e., the device will completely block the input light beam without applying voltage to Pockels cell 37) by rotating the polarization orientation plane 35 of the second polarizer 34-2 90 degrees from its normally-open position depicted on FIG. 3B. In another version, all facets of the optical components including the polarizers, the Faraday rotator, and the Pockels cell can be coated with multiple layers of anti-reflection dielectric thin films to eliminate the reflections and reduce the light insertion loss. Additionally, the first polarizer, the Faraday rotator, the Pockels cell and the second polarizer can be bonded with adhesives which are transparent to the selected optical wavelength, or bonded by adhesives without covering or interfering with areas through which the light beam passes. Therefore, the spirit and scope of the appended claims should not be limited to the description of the preferred versions contained herein.

What is claimed is:

1. An optical device consisting essentially of:
   a first polarizer having a first polarization plane, said first polarizer receiving an input light beam and generating an output beam polarized along the first polarization plane;
   a Faraday rotator that rotates the polarized output beam of the first polarizer to generate a first rotated beam, said rotated beam being rotated by an angle of 45 degrees relative to the first polarization plane;
   a Pockels cell that receives the first rotated beam from the Faraday rotator and an external input voltage to generate a second rotated beam, said second rotated beam being rotated by an angle between 0 degrees and 90 degrees relative to the first rotated beam depending on the input voltage; and
   a second polarizer having a second polarization plane with an angle that is 45 degrees relative to the first polarization plane, said second polarizer receiving the second rotated beam to generate a device output beam having a maximum intensity when the Pockels cell rotates the beam by 0 degrees, zero or close to zero intensity when the Pockels cell rotates the beam by 90 degrees, and variable intensity when the Pockels cell rotates the beam in a range between 0 degrees and 90 degrees,
   wherein said device has an isolation function that varies with the intensity of the device output beam, the isolation being a maximum when the intensity of the device output beam is a maximum.

2. The device of claim 1, wherein said input light beam is substantially linearly polarized, substantially coherent, monochromatic and collimated, and oriented with the polarization axis of said first polarizer.

3. The device of claim 1 wherein said Faraday rotator is configured for a single wavelength or within certain wavelength range to rotate 45 degrees of polarization plane of said input light beam.

4. The device of claim 1, wherein said Faraday rotator is selected to meet a wavelength requirement for a particular application.

5. The device of claim 1,
   wherein said Pockels cell includes an electric field sensitive medium;
   wherein the external voltage supplies the energy for an electric field applied to the medium of said Pockels cell; and
   wherein the electric field applied to said Pockels cell medium is either longitudinal or transverse to the light beam input to the Pockels cell.

6. The device of claim 5, wherein said Pockels cell medium is selected to meet a specific wavelength requirement according to an application of the optical device.

7. The device of claim 1,
   wherein said polarizers, said Faraday rotator, and said Pockels cell have a number of facets; and
   wherein all facets of said polarizers, said Faraday rotator, and said Pockels cell are coated with multiple layers of anti-reflection dielectric thin films to eliminate reflections and reduce light insertion loss.

8. The device of claim 1
   wherein the device is operable to pass a light beam respectively through each of said polarizers, Faraday rotator, and Pockels cell; and
   wherein the said first polarizer, said Faraday rotator, said Pockels cell, and said second polarizer are bonded with adhesives that are transparent to the selected optical wavelength, or bonded by adhesives without interfering with areas through which the light beam passes.

9. The device of claim 1, further comprising an electric driver that supplies the external input voltage to the Pockels cell.

10. The device of claim 9, where in the electric driver operates the optical device as an attenuator.

11. The device of claim 9, where in the electric driver operates the optical device as a modulator.

12. The device of claim 9, where in the electric driver operates the optical device as shutter.

* * * * *